(12) United States Patent
Lindholm et al.

(10) Patent No.: US 7,676,657 B2
(45) Date of Patent: *Mar. 9, 2010

(54) ACROSS-THREAD OUT-OF-ORDER INSTRUCTION DISPATCH IN A MULTITHREADED MICROPROCESSOR

(75) Inventors: John Erik Lindholm, Saratoga, CA (US); Brett Coon, San Jose, CA (US); Simon S. Moy, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 11/548,272

(22) Filed: Oct. 10, 2006

(65) Prior Publication Data

US 2007/0214343 A1    Sep. 13, 2007

Related U.S. Application Data

(63) Continuation-in-part of application No. 10/742,514, filed on Dec. 18, 2003, now Pat. No. 7,310,722.

(51) Int. Cl.
*G06F 9/00* (2006.01)
(52) U.S. Cl. .................. 712/220; 712/215; 712/216; 718/100; 718/102
(58) Field of Classification Search .......... 345/613; 712/215, 216, 220; 718/100, 102
See application file for complete search history.

(56) References Cited

U.S. PATENT DOCUMENTS

| 3,771,138 A | 11/1973 | Celtruda et al. |
|---|---|---|
| 5,357,617 A | 10/1994 | Davis et al. |
| 5,721,855 A | 2/1998 | Hinton et al. |
| 5,761,522 A | 6/1998 | Hisanaga et al. |
| 6,073,159 A | 6/2000 | Emer et al. |
| 6,092,181 A | 7/2000 | Nguyen et al. |
| 6,493,741 B1 | 12/2002 | Emer et al. |
| 6,574,725 B1 | 6/2003 | Kranich et al. |
| 6,897,871 B1 | 5/2005 | Morein et al. |
| 7,015,930 B2 * | 3/2006 | Gruber ................... 345/606 |
| 7,418,576 B1 * | 8/2008 | Lindholm et al. ........ 712/214 |

FOREIGN PATENT DOCUMENTS

WO    WO 0177821 A1    10/2001

OTHER PUBLICATIONS

Tullsen et al., "Simultaneous multithreading: maximizing on-chip parallelism", Proceedings of the 22nd annual international symposium on Computer architecture, ACM, May 1995, pp. 392-403.*

(Continued)

*Primary Examiner*—William M Treat
(74) *Attorney, Agent, or Firm*—Townsend and Townsend and Crew LLP (57) ABSTRACT

Instruction dispatch in a multithreaded microprocessor such as a graphics processor is not constrained by an order among the threads. Instructions for each thread are fetched, and a dispatch circuit determines which instructions in the buffer are ready to execute. The dispatch circuit may issue any ready instruction for execution, and an instruction from one thread may be issued prior to an instruction from another thread regardless of which instruction was fetched first. If multiple functional units are available, multiple instructions can be dispatched in parallel.

19 Claims, 5 Drawing Sheets

OTHER PUBLICATIONS

Eggers et al., Simultaneous Multithreading: A Platform for Next Generation Processors, IEEE Micro, Sep./Oct. 1997, pp. 12-19.*

Mauricio J. Serrano, Performance Tradeoffs in Multistreamed Superscalar Architectures, Doctoral Dissertation, University of California, Santa Barbara, Mar. 1994.*

Eggers et al. "Simultaneous multithreading: a platform for next generation processors" IEEE Micro, Sep./Oct. 1997 (vol. 17, No. 5) pp. 12-19.

Marr et al. Hyper Threading Technology Architecture and Microarchitecture, Intel Technology Journal Q1, 2002.

Tullsen et al. Institute of Electrical and Electronics Engineers Association for Computing Machinery "Exploiting Choice: Instruction Fetch and Issue on a Implementable Simultaneous Multithreading Processor" Proceedings of the 23rd Annual Symposium on Computer Architecture, New York, vol. SYMP, 23, May 22, 1996, pp. 191-202.

European Patent Application No. 04029906.7, Examination Report dated Jun. 25, 2008, 5 pages.

* cited by examiner

ACROSS-THREAD OUT-OF-ORDER INSTRUCTION DISPATCH IN A MULTITHREADED MICROPROCESSOR

CROSS-REFERENCES TO RELATED APPLICATIONS

This application is a continuation-in-part of application Ser. No. 10/742,514, filed Dec. 18, 2003, entitled "Across-Thread Out-of-Order Instruction Dispatch in a Multithreaded Processor," which disclosure is incorporated herein by reference for all purposes.

BACKGROUND OF THE INVENTION

The present invention relates in general to multithreaded microprocessors, and in particular to dispatching instructions for execution in a multithreaded microprocessor without regard to order among threads.

To meet the needs of video gamers, simulation creators, and other program designers, sophisticated graphics co-processors have been developed for a variety of computer systems. These processors, which generally operate under the control of a general-purpose central processing unit or other master processor, are typically optimized to perform transformations of scene data into pixels of an image that can be displayed on a standard raster-based display device. In a common configuration, the graphics processor is provided with "geometry data," which usually includes a set of primitives (e.g., lines, triangles, or other polygons) representing objects in a scene to be rendered, along with additional data such as textures, lighting models, and the like. The graphics processor performs modeling, viewpoint, perspective, lighting, and similar transformations on the geometry data (this stage is often referred to as "vertex" processing). After these transformations, "pixel" processing begins. During pixel processing, the geometry data is converted to raster data, which generally includes color values and other information for each sample location in an array corresponding to the viewable area; further transformations may be applied to the raster data, including texture blending and downfiltering (reducing the number of sample locations to correspond to the number of pixels in the display device). The end result is a set of color values that can be provided to the display device.

To provide smooth animations and a real-time response, graphics processors are generally required to complete these operations for a new frame of pixel data at a minimum rate of about 30 Hz. As images become more realistic-with more primitives, more detailed textures, and so on-the performance demands on graphics processors increase.

To help meet these demands, some existing graphics processors implement a multithreaded architecture that exploits parallelism. As an example, during vertex processing, the same operations are usually performed for each vertex; similarly, during pixel processing, the same operations are usually performed for each sample location or pixel location. Operations on the various vertices (or pixels) tend to be independent of operations on other vertices (pixels); thus, each vertex (pixel) can be processed as a separate thread executing a common program. The common program provides a sequence of instructions to execution units in an execution core of the graphics processor; at a given time, different threads may be at different points in the program sequence. Since the execution time (referred to herein as latency) of an instruction may be longer than one clock cycle, the execution units are generally implemented in a pipelined fashion so that a second instruction can be issued before all preceding instructions have finished, as long as the second instruction does not require data resulting from the execution of an instruction that has not finished.

In such processors, the execution core is generally designed to fetch instructions to be executed for the different active threads in a round-robin fashion (i.e., one instruction from the first thread, then one from the second, and so on) and present each fetched instruction sequentially to an issue control circuit. The issue control circuit holds the fetched instruction until its source data is available and the execution units are ready, then issues it to the execution units. Since the threads are independent, round-robin issue reduces the likelihood that an instruction will depend on a result of a still-executing instruction. Thus, latency of an instruction in one thread can be hidden by fetching and issuing an instruction from another thread. For instance, a typical instruction might have a latency of 20 clock cycles, which could be hidden if the core supports 20 threads.

However, round-robin issue does not always hide the latency. For example, pixel processing programs often include instructions to fetch texture data from system memory. Such an instruction may have a very long latency (e.g., over 100 clock cycles). After a texture fetch instruction is issued for a first thread, the issue control circuit may continue to issue instructions (including subsequent instructions from the first thread that do not depend on the texture fetch instruction) until it comes to an instruction from the first thread that requires the texture data. This instruction cannot be issued until the texture fetch instruction completes. Accordingly, the issue control circuit stops issuing instructions and waits for the texture fetch instruction to be completed before beginning to issue instructions again. Thus, "bubbles" can arise in the execution pipeline, leading to idle time for the execution units and inefficiency in the processor.

One way to reduce this inefficiency is by increasing the number of threads that can be executed concurrently by the core. This, however, is an expensive solution because each thread requires additional circuitry. For example, to accommodate the frequent thread switching that occurs in this parallel design, each thread is generally provided with its own dedicated set of data registers. Increasing the number of threads increases the number of registers required, which can add significantly to the cost of the processor chip, the complexity of the design, and the overall chip area. Other circuitry for supporting multiple threads, e.g., program counter control logic that maintains a program counter for each thread, also becomes more complex and consumes more area as the number of threads increases.

It would therefore be desirable to provide an execution core architecture that efficiently and effectively reduces the occurrence of bubbles in the execution pipeline without requiring substantial increases in chip area.

BRIEF SUMMARY OF THE INVENTION

Embodiments of the present invention provide systems and methods for dispatching instructions in a multithreaded microprocessor (such as a graphics processor) in a manner that is not constrained by an order among the threads. Instructions for the various threads are fetched, e.g., into an instruction buffer that is configured to store at least one instruction from each of the threads. A dispatch circuit determines which of the fetched instructions are ready to execute and may issue any instruction that is ready. Thus, an instruction from any one thread may be issued prior to an instruction from another thread, regardless of which instruction was fetched first.

According to an aspect of the present invention, a method for executing multiple threads in a multithreaded processor includes defining multiple threads, each of which executes a sequence of program instructions. A first instruction for a first one of the threads and a second instruction for a second one of the plurality of threads are each fetched. The first instruction has a latency period associated therewith, and during the latency period associated with the first instruction, the second instruction is issued. The first instruction and the second instruction are issued in an order independent of an order in which the first and second instructions were fetched.

In some embodiments, the first thread and the second thread execute different programs. In other embodiments, the first thread and the second thread execute the same program on different input data, and the first instruction and the second instruction might be instructions from different portions of the same program.

In some embodiments, the first instruction is issued to a first functional unit in the multithreaded processor and the second instruction is issued to a second functional unit in the multithreaded processor.

In some embodiments, during the latency period associated with the first instruction, a third instruction is issued. The first instruction, the second instruction, and the third instruction are issued in an order independent of an order of instruction fetch. The third instruction might be an instruction for a third one of the threads, an instruction for the second thread, or an instruction for the first thread; it should be noted that two instructions from the same thread can be issued in consecutive processing cycles. In some embodiments, instructions within a thread are always issued in order. Further, in some cases the second instruction and the third instruction can be issued in parallel.

According to another aspect of the present invention, a method for executing multiple threads in a multithreaded processor includes defining multiple threads, each of which executes a sequence of program instructions. Instructions are fetched, including a first instruction for a first one of the threads, a second instruction for a second one of the threads, and a third instruction for a third one of the threads. In one example, the first instruction is fetched subsequently to the third instruction. The first instruction is issued to a first functional unit in the multithreaded processor prior to issuing the third instruction, and in parallel with issuing the first instruction, the second instruction is issued to a second functional unit in the multithreaded processor. The third instruction can be issued at a later time, e.g., during a latency period associated with one of the first instruction or the second instruction.

According to a further aspect of the present invention, a microprocessor is configured for parallel processing of multiple threads, each of which executes a sequence of program instructions. The microprocessor includes an execution module, a fetch circuit, and an issue circuit. The execution module is adapted to execute instructions for all of the threads. The fetch circuit is adapted to fetch instructions from a sequence of program instructions for each of the threads. The issue circuit is adapted to issue the instructions fetched by the fetch circuit to the execution module. The instructions for different ones of the plurality of threads are issued in an order independent of an order in which the instructions for the different ones of the plurality of threads were fetched. The issue circuit is advantageously adapted such that, during a latency period associated with a first issued instruction for a first one of the threads, the issue circuit can issue at least one instruction for a second one of the threads. In some embodiments, the fetch circuit is adapted to fetch a subsequent instruction for a first thread in response to the issue circuit issuing a previously fetched instruction for the first thread.

In some embodiments, the execution module includes a plurality of functional units and the issue circuit is further adapted to issue at least two instructions in parallel, each of the instructions issued in parallel being directed to a different one of the functional units. The instructions issued in parallel might (or might not) be for different threads. The maximum number of instructions issuable in parallel can be less than the number of functional units in the execution module.

The following detailed description together with the accompanying drawings will provide a better understanding of the nature and advantages of the present invention.

DETAILED DESCRIPTION OF THE INVENTION

Embodiments of the present invention provide systems and methods for dispatching instructions in a multithreaded microprocessor (such as a graphics processor) in a manner that is not constrained by an order among the threads. Instructions for the various threads are fetched, e.g., into an instruction buffer that is configured to store at least one instruction from each of the threads. A dispatch circuit determines which of the fetched instructions are ready to execute and may issue any instruction that is ready. Thus, an instruction from any one thread may be issued prior to an instruction from another thread, regardless of which instruction was fetched first.

Figure 1:
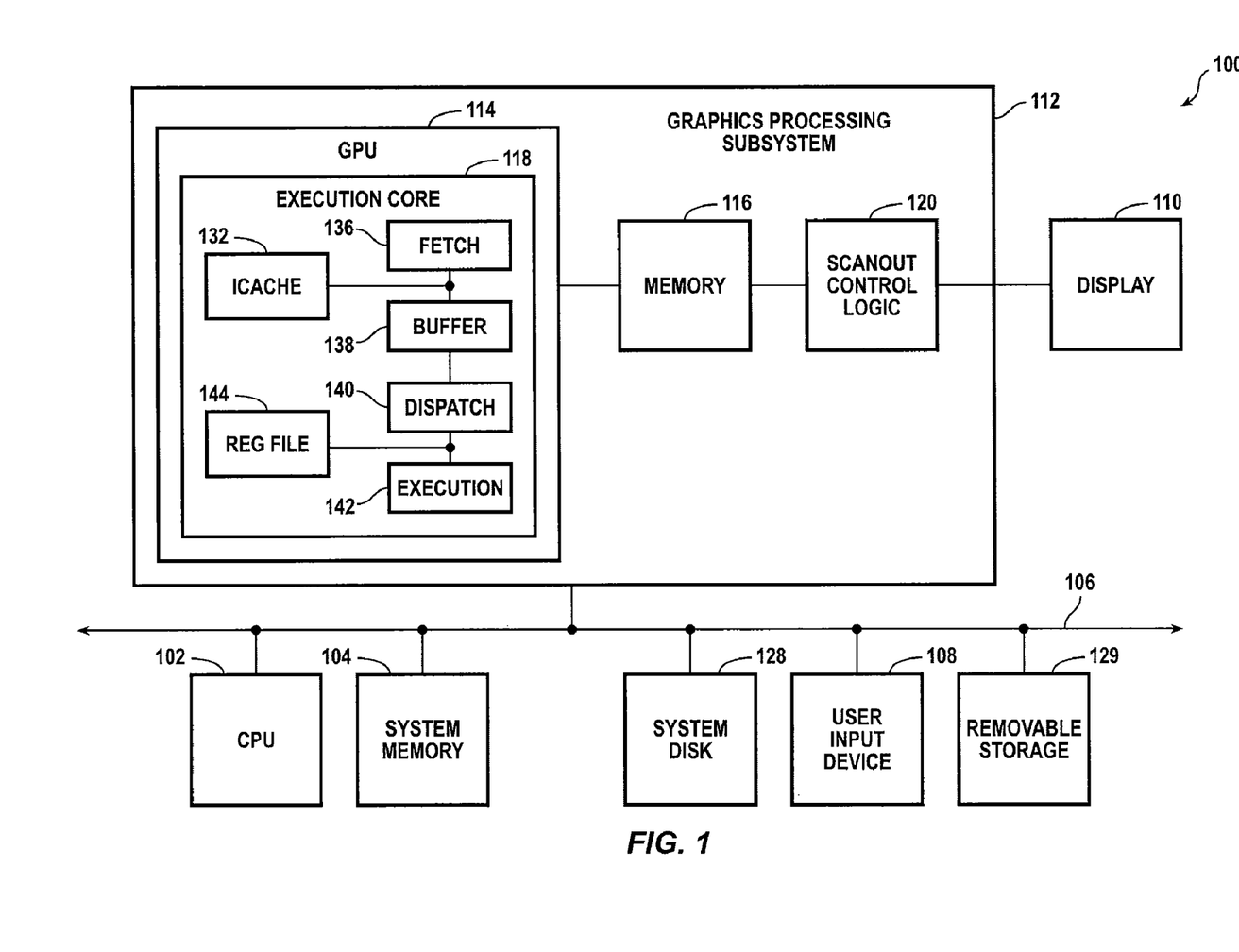
FIG. 1 is a simplified high-level block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 128 and other components, such as one or more removable storage devices 129 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Accelerated Graphics Port) and/or PCI-Express (PCI-E); appropriate "bridge" chips such as a conventional north bridge and south bridge (not shown) may be provided to interconnect various components and/or buses.

Graphics processing subsystem 112 includes a graphics processing unit (GPU) 114, a graphics memory 116, and scanout control logic 120, which may be implemented, e.g., using one or more integrated circuit devices such as programmable processors and/or application specific integrated circuits (ASICs). GPU 114 may be configured to perform various tasks, including generating pixel data from graphics data supplied via system bus 106, interacting with graphics memory 116 to store and update pixel data, and the like. Relevant features of GPU 114 are described further below.

Scanout control logic 120 reads pixel data from graphics memory 116 (or, in some embodiments, system memory 104) and transfers the data to display device 110 to be displayed. In one embodiment, scanout occurs at a constant refresh rate (e.g., 80 Hz); the refresh rate can be a user selectable parameter. Scanout control logic 120 may also perform other operations such as adjusting color values for particular display hardware; generating composite screen images by combining the pixel data with data for a video or cursor overlay image or the like obtained, e.g., from graphics memory 116, system memory 104, or another data source (not shown); converting digital pixel data to analog signals for the display device; and so on. It will be appreciated that the particular configuration of graphics processing subsystem 112 is not critical to the present invention.

During operation of system 100, CPU 102 executes various programs, such as operating system (OS) programs, and application programs, as well as a driver program for graphics processing subsystem 112. These programs may be of generally conventional design. For instance, the graphics driver program may implement one or more standard application program interfaces (APIs), such as Open GL, Microsoft DirectX, or D3D for communication with graphics processing subsystem 112; any number or combination of APIs may be supported, and in some embodiments separate driver programs may be provided to implement different APIs. By invoking appropriate API function calls, operating system programs and/or application programs instruct the graphics driver program to transfer graphics data or pixel data to graphics processing subsystem 112 via system bus 106, to invoke various rendering functions of GPU 114, and so on. The specific commands and/or data transmitted to graphics processing subsystem 112 by the graphics driver program in response to an API function call may vary depending on the implementation of GPU 114, and the graphics driver program may also transmit commands and/or data implementing additional functionality (e.g., special visual effects) not controlled by operating system or application programs.

In accordance with an embodiment of the present invention, GPU 114 is configured for concurrent processing of a large number of threads, where each thread corresponds to an independent sequence of processing instructions. GPU 114 can issue a next instruction from any of the threads at any given time. In some embodiments, GPU 114 issues one instruction per cycle; in other embodiments, multiple instructions from different threads (or in some instances from the same thread) can be issued in parallel.

For example, multiple threads might be used to process vertices of an image, with concurrent threads executing the same processing program(s) on different data for the image; at a given time, different ones of the threads may be at different points in the program. In some embodiments, there may be multiple thread types, where all threads of one type perform the same processing program and threads of different types perform different processing programs. For example, there may be a "vertex" thread type whose processing program includes geometry and lighting transformations and a "pixel" thread type whose processing program includes texture blending and downfiltering of oversampled data.

In the embodiment of FIG. 1, GPU 114 includes a number of independent execution cores 118, each of which is configured to process instructions received from a number of threads (not shown). The maximum number of concurrent threads supported by GPU 114 is the number of cores 118 multiplied by the number of threads per core; for instance, in one embodiment, there are eight cores 118, each of which can support up to 16 threads, for a total of 128 concurrently executing threads. The number of cores and number of threads may be varied; for example, there may be eight cores, each supporting 32 threads (256 total threads); ten cores, each supporting 24 threads (240 total threads); 16 cores, each supporting 24 threads (384 total threads), and so on.

Each execution core 118 includes an instruction cache 132, an instruction fetch circuit 136, a buffer 138, a dispatch circuit 140, an execution module 142 that includes a set of execution units (not shown), and a register file 144. Instruction cache (Icache) 132, which may be of generally conventional design, stores executable instructions that are obtained, e.g., from graphics memory 116. Each instruction in Icache 132 may be identified using a program counter (PC) value; in one embodiment, the PC value includes a base PC value associated with the program to which the instruction belongs and an offset PC value specific to the instruction. In some embodiments, Icache 132 may be logically divided, with instructions from different programs occupying different logical subdivisions within Icache 132. Fetch circuit 136 fetches instructions from Icache 132 for all threads processed by execution core 118, maintaining a sequential program order within each thread, and supplies the fetched instructions to a buffer 138. On each clock cycle, dispatch circuit 140 selects an instruction from buffer 138 to be issued to execution module 142.

In one embodiment, buffer 138 is configured to store at least one instruction per thread and to maintain the sequential program order for each thread. On each clock cycle, dispatch circuit 140 selects one of the instructions from buffer 138 for execution, obtains the source operands from register file 144, and forwards the instruction and operands to execution module 142 for execution. Dispatch circuit 140 advantageously selects a next instruction to execute based on which instructions in buffer 138 have their source operands available in register file 144 and may select instructions without regard for which thread is the source of the selected instruction. Fetch circuit 136 monitors buffer 138 and fetches new instructions to replace instructions that have issued from buffer 138. In one embodiment, after an instruction for a particular thread has issued from buffer 138, fetch circuit 138 fetches a subsequent instruction for that thread. As a result, for a given clock cycle, instructions from most or all of the active threads may be available in buffer 138, and dispatch circuit 140 may select an instruction from any thread, regardless of which thread was last selected. Specific embodiments of fetch circuit 136, buffer 138 and dispatch circuit 140 are described below.

Execution module 142 may be of generally conventional design and may include any number of individual execution units. Some or all of the execution units may be configured for single-instruction multiple-data (SIMD) operation as is known in the art. Execution module 142 receives an instruction and its source operands from dispatch circuit 140, processes the source operands in accordance with the instruction, and stores result data in register file 144. Register file 144 advantageously includes a separate set of registers for each thread processed by execution unit 118, thereby avoiding the need to swap data in and out of registers when switching from one thread to another. Data written to register file 144 becomes available as source operands for subsequent instructions. The instructions may vary in character and may include any number of source operands and any amount and/or kind of result data.

Each instruction generally has a certain latency associated with it; that is, the execution units of execution module 142 require a certain number of clock cycles (which may be one or more) to process the instruction and write the result data to register file 144. Different instructions may have different latencies. For example, a simple vector add operation may be completed in only one or two clock cycles, while a texture fetch operation may require a large number (e.g., 100 or more) of cycles. Execution units of execution module 142 are advantageously implemented in a pipelined architecture so that an instruction can be dispatched on each clock cycle notwithstanding the latency; such architectures are known in the art. Different ones (or groups) of the execution units may be specially adapted to process particular instructions, as is known in the art, and dispatch circuit 140 may select an appropriate one (or group) of execution units within execution module 142 to process a particular instruction.

The instructions of a thread may have data dependencies on other instructions of that thread; that is, one instruction may use result data of a previous instruction as its source operand. An instruction with a data dependency cannot execute until the result data from the instruction on which it depends is available in register file 144. If an instruction with such a data dependency is next for a particular thread, that thread is blocked. In accordance with an embodiment of the present invention, dispatch circuit 140 detects a blocked thread and selects the next instruction of a different thread (which may be any thread that is not blocked) from buffer 138 to be issued next, rather than waiting for the blocked thread to become unblocked. In this manner, latency within one thread can be hidden by executing another thread, so that the efficiency of GPU 114 is improved.

In addition to execution core 118, GPU 114 may also include other features not shown in FIG. 1, such as circuitry for receiving and responding to commands received via system bus 106; such circuitry may be configured to initiate and/or terminate threads in execution core 118 as appropriate. Various control registers, status registers, data caches and the like may be provided on a global, per-core, or per-thread basis. Such features are known in the art, and a detailed description is omitted as not being crucial to understanding the present invention.

It will be appreciated that the system described herein is illustrative and that variations and modifications are possible. A graphics processor may be implemented using any suitable technologies, e.g., as one or more integrated circuit devices. A graphics processor may be mounted on an expansion card (which may include one or more such processors) or integrated into a system chipset (e.g., into the north bridge chip). The graphics processing subsystem may include any amount of dedicated graphics memory (some implementations may have no dedicated graphics memory and may use system memory and dedicated graphics memory in any combination. Further, in some embodiments, the graphics processor may be configurable to perform general-purpose computations, e.g., by providing an appropriate driver program.

The number of execution cores in the graphics processor is implementation dependent, and optimal choices generally depend on tradeoffs between performance and cost. Each execution core may support concurrent operation of one or more thread types; where multiple cores are provided, different cores in the same processor may be configured identically or differently. The cores are advantageously implemented as independent sub-processors that do not share execution units, and a given thread is executed in one core.

The number of threads in a given core may also be varied according to the particular implementation and the amount of latency that is to be hidden. In this connection, it should be noted that in some embodiments, instruction ordering can also be used to hide some latency. For instance, as is known in the art, compilers for graphics processor code can be optimized to arrange the instructions of the program such that if there is a first instruction that creates data and a second instruction that consumes the data, one or more other instructions that do not consume the data created by the first instruction are placed between the first and second instructions. This allows processing of a thread to continue while the first instruction is executing. It is also known in the art that, for instructions with long latencies, it is usually not practical to place enough independent instructions between creator and consumer to fully hide the latency. In determining the number of threads per core, consideration may be given to the availability (or lack thereof) of such optimizations; e.g., the number of threads supported by a core may be decided based on the maximum latency of any instruction and the average (or minimum or maximum) number of instructions that a particular compiler can be expected to provide between a maximum-latency instruction and its first dependent instruction.

The instruction cache for an execution core may be shared among the threads or may be physically or logically divided among them. In addition, where the core supports multiple thread types, the instruction cache may include a physical and/or logical division corresponding to each thread type, and each division may be further subdivided (or not) among individual threads of that type as desired.

The register file for an execution core advantageously includes a set of registers for each thread and may have any number of read and/or write ports. In addition, physically and/or logically separate register files may be provided for different threads.

Figure 2:
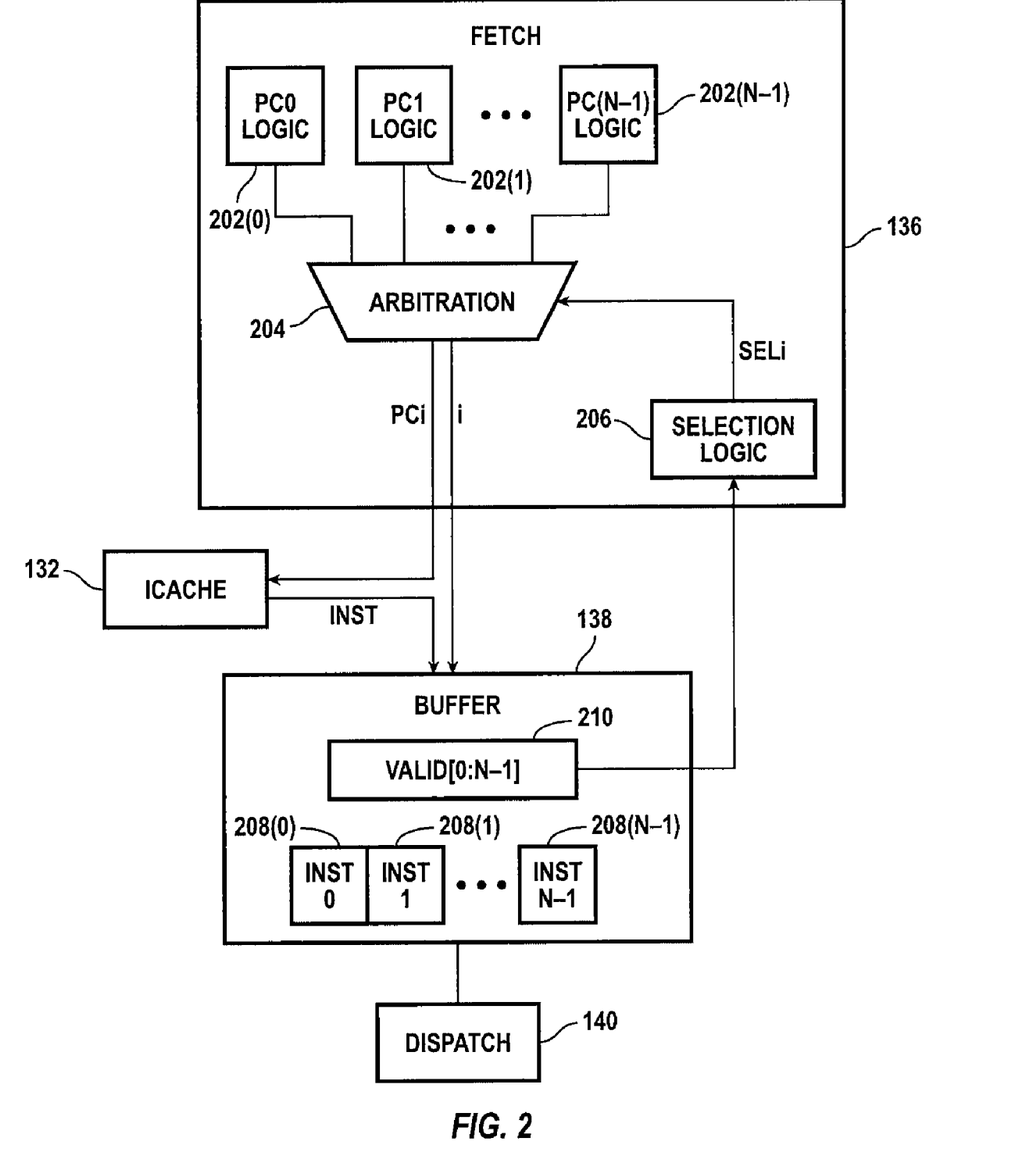
FIG. 2 is a simplified block diagram of an instruction fetch circuit and instruction buffer according to an embodiment of the present invention.

While the configuration of fetch circuit 136, buffer 138, and dispatch circuit 140 may also be varied, specific examples will now be described. FIG. 2 is a simplified block diagram of fetch circuit 140 and buffer 138 for an execution core 118 according to an embodiment of the present invention. In this embodiment, execution core 118 is configured to process up to a maximum number (N) of threads concurrently, although it is to be understood that at any given time some or all of the N threads may be idle or inactive.

Fetch circuit 136 includes a number (N) of program counter logic blocks 202 and an arbitration unit 204 controlled by selection logic circuit 206. (Herein, multiple instances of like objects are denoted with reference numbers identifying the object and parenthetical numbers identifying the instance where needed.)

Each program counter logic block 202 generates a program counter (PC) value for a next sequential instruction in a respective one of the N threads. Program counter logic blocks 202 may be of generally conventional design for updating a program counter and may include incremental counters, branch detection logic, and other features not critical to the present invention.

The PC values generated by PC logic blocks 202 are presented to arbitration unit 204, which selects the PC signal PCi (where $0 \leq i \leq n-1$) from one of the threads (denoted for reference herein as thread i) in response to a selection signal SELi provided by selection block 206 (described below). The selected signal PCi is transmitted to Icache 132, which returns the corresponding instruction to buffer 138, and the identifier (i) of the corresponding thread is transmitted to buffer 138.

Buffer 138 includes N storage locations 208 (which may be implemented, e.g., using registers), one of which corresponds to each of the N threads, and an array 210 configured to store N valid bits (one for each register). Buffer 138 receives the instruction (INST) from Icache 132 and the thread identifier (i) of the corresponding thread from arbitration unit 204 and directs the instruction INST to the one of locations 208 that corresponds to thread i. When the instruction is stored, the corresponding valid bit in array 210 is set to logical true (e.g., "1").

Buffer 138 is advantageously configured such that dispatch circuit 140 may select an instruction from any one of storage locations 208 to be issued, so that instructions from different threads may be issued in any order. Dispatch circuit 140 is described below; for now it should be noted that when the instruction for a particular thread is issued, the corresponding valid bit in array 210 is advantageously set to logical false (e.g., "0"). As used herein, a "valid thread" is one that has a valid instruction in storage locations 208 and an "invalid thread" is one that does not.

As shown in FIG. 2, selection logic circuit 206 receives the valid bits of array 210 from buffer 138. Selection logic circuit 206 uses validity or invalidity of each thread in selecting the thread i for which an instruction is to be fetched. For example, selection logic circuit 206 may be configured to select only invalid threads; where multiple threads are invalid, selection logic circuit 206 may select the thread that has been invalid longest or may select a thread based on a priority ranking among the threads, where the priority ranking varies from one clock cycle to the next.

Selection logic circuit 206 may also include a rule limiting the frequency with which a particular thread can be selected, e.g., in order to prevent one thread from disproportionately consuming resources. For example, one rule might provide that a given thread is ineligible for reselection until at least M clock cycles have elapsed since it was last selected, where M is some fixed number (which may be established, e.g., as a configurable parameter of the processor). Where such a rule is implemented, there may be clock cycles in which no threads satisfy the selection rules (e.g., the only invalid thread was selected fewer than M cycles ago). In this event, arbitration unit 204 may send no PCi value to Icache 132 for that clock cycle; the next PCi value is sent during a subsequent cycle when a satisfactory thread is found. In one such embodiment, where one thread is selected per clock cycle, M is set to a value that is not larger than the minimum number of threads expected to be active at a given time, thereby reducing the likelihood of a clock cycle in which no thread is selected. In some embodiments, a particular hardware implementation may inherently limit the frequency with which a thread can be selected without requiring additional control logic and/or configuration software.

Figure 3:
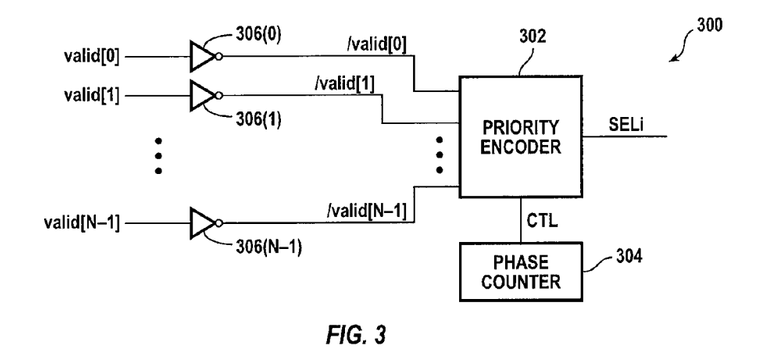
FIG. 3 is a simplified block diagram of a selection logic circuit for selecting an instruction to fetch according to an embodiment of the present invention.

FIG. 3 is a simplified block diagram of a selection logic circuit 300 implementing thread selection rules according to an embodiment of the present invention. Selection logic circuit 300 includes a priority encoder 302 and a phase (or token) counter 304. The valid signal for each thread is inverted by a respective inverter 306, and the resulting/valid signals are provided to priority encoder 302. Priority encoder 302, which may be implemented using conventional digital logic circuitry, selects the highest-priority thread for which the/valid signal is asserted (i.e., the highest-priority invalid thread), where the priority ranking among the threads is determined based on a control signal (CTL) provided by phase counter 304. Phase counter 304 is a modulo N counter that increments on every clock cycle; the control signal CTL corresponds to the current value of phase counter 304. In this embodiment, control signal CTL determines the thread number of the highest-priority thread, and priority encoder 302 ranks the remaining threads in order of ascending (or descending) thread numbers, modulo N.

Because phase counter 304 increments at each clock cycle, the priority ranking of the threads is different for different clock cycles. For example, during a first clock cycle, current thread counter 304 has value 0, and priority encoder 302 gives highest priority to thread 0. In other words, during the first clock cycle, if thread 0 is invalid, priority encoder 302 generates a state of the SELi signal that selects thread 0. If thread 0 is valid, thread 1 is considered next, and so on until an invalid thread is found or a maximum number of threads (which may be less than or equal to N) has been considered. During the next clock cycle, current thread counter 304 has value 1, and priority encoder 302 gives highest priority to thread 1, then to thread 2 if thread 1 is valid, and so on.

Once a thread becomes invalid, it remains invalid until its next instruction is fetched. Thus, while selection logic circuit 300 does not guarantee that, on any given clock cycle, the thread that has been invalid longest is selected, it will be appreciated that any thread that becomes invalid will be selected within N clock cycles of becoming invalid. In some embodiments, the maximum number C of threads that priority encoder 302 considers during a clock cycle may be limited to a number smaller than the total number N of threads. As long as the priority rotates regularly, each thread will be among the C threads considered for an approximately equal fraction of cycles and will eventually be selected. (It should be noted that in embodiments where C is less than N, if the issued instruction on a given cycle is for the highest-priority thread, then that thread would not be considered in the next cycle.)

It will be appreciated that the selection logic circuit and selection rules described herein are illustrative and that variations and modifications are possible. The various circuit components described herein may be implemented using conventional digital logic circuit designs and technologies. Different logic circuits may also be implemented to support different selection rules. For example, in embodiments where more than one instruction may be fetched per clock cycle, the priority encoder may be configured to select multiple threads per clock cycle. Moreover, devices other than priority encoders may be used for determining which invalid thread to select. For instance, the selection logic circuit may maintain a "least recently valid" bit field that is updated when a transition of one of the valid bits between the logical true and logical false states is detected. In still other embodiments, counters or similar circuits may be used to determine elapsed time since a thread became invalid and/or elapsed time since a thread was last selected; comparison logic that operates on the counter values may be provided to identify a least recently valid thread.

Figure 4:
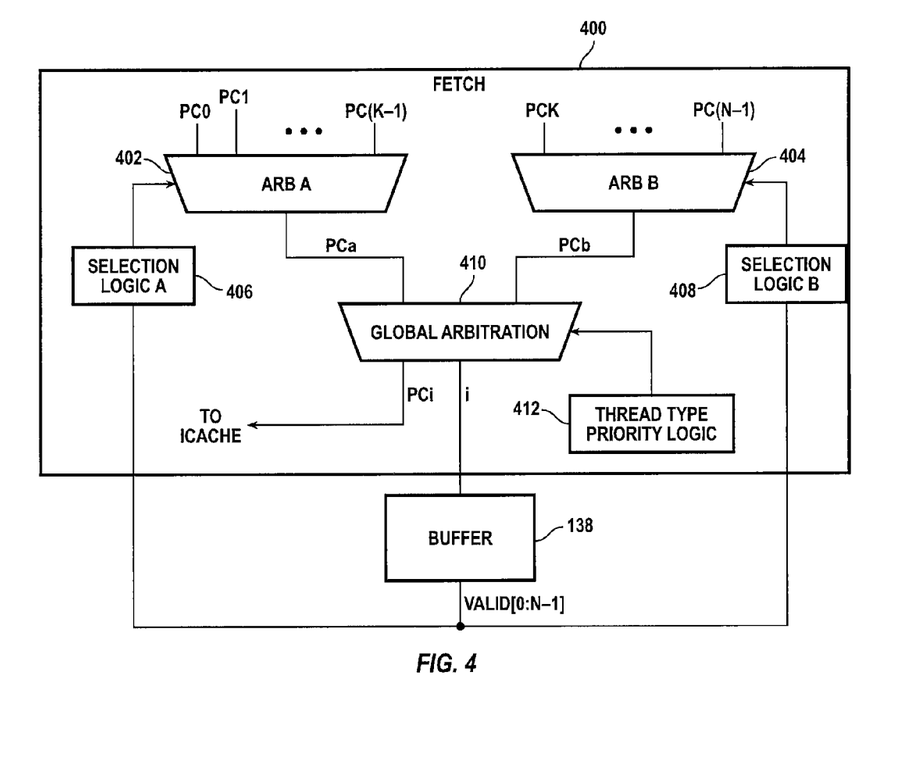
FIG. 4 is a simplified block diagram of an instruction fetch circuit according to an alternative embodiment of the present invention.

In addition, the selection logic may include additional circuitry that inhibits selection of a thread between a selection time and a time when the corresponding instruction appears in buffer 138. For example, in the event of an Icache miss, it may take several cycles to retrieve the instruction from the main instruction store (or a secondary cache) and provide it to buffer 138. In some embodiments, it may be desirable to inhibit reselection of that thread during this interval, e.g., to prevent instructions within a thread from being provided to buffer 138 and/or issued out of their program order. It should be noted that because fetch circuit 136 does not select threads in a round robin fashion, instructions from other threads may continue to be fetched to buffer 138 and issued while fetching of instructions for a thread that encountered an Icache miss is inhibited. Thus, some embodiments described herein can avoid pipeline bubbles and inefficiency in the event of an Icache miss.

Where multiple thread types are supported, the selection logic may take thread type into account or not, as desired. For example, in the embodiment shown in FIG. 2, information about thread types is not provided to selection logic circuit 206. FIG. 4 is a block diagram of a fetch circuit 400 according to an alternative embodiment of the present invention that takes thread type into account. In this embodiment, the execution core also supports N threads, which may include up to K threads of a first type ("A") and up to N−K threads of a second type ("B").

A type A arbitration unit 402 receives program counter signals from the active type A threads (numbered for reference purposes as 0 to K−1), and a type B arbitration unit 404 receives program counter signals from the active type B threads (numbered for reference purposes as K to N−1). Type A arbitration unit 402 selects one of the type A threads in response to a selection signal from selection logic circuit 406, and type B arbitration unit 404 selects one of the type B threads in response to a selection signal from selection logic circuit 408. In one embodiment, the configuration of each of selection logic circuits 406, 408 is generally similar to that described above with reference to FIG. 3 so that each selection logic circuit 406, 408 selects the thread of its respective type that has been invalid the longest; it will be appreciated that other configurations and selection rules may also be used. As described above, depending on the selection rules, there may be clock cycles for which one (or both) of arbitration units 402, 404 does not select any thread.

In response to the selection signals from selection logic circuits 406, 408, type A arbitration unit 402 and type B arbitration unit 404 provide respective selected program counter values (PCa, PCb) to a global arbitration unit 410. Arbitration units 402, 404 also advantageously identify the respective threads (a, b) that were selected. Global arbitration unit 410 selects between PCa and PCb in response to a type selection signal (A/B) generated by a thread-type priority circuit 412.

Thread-type priority circuit 412 may be configured in various ways to define a desired relative priority between thread types A and B. In one embodiment, thread type priority circuit 412 may be configured to give equal priority to both, e.g., by selecting PCa and PCb on alternating clock cycles. In another embodiment, thread type priority circuit 412 may select the least recently valid of the two candidate threads.

In yet another embodiment, thread type priority circuit 412 gives priority to one or the other thread type based on static or dynamic "importance" criteria. Various criteria may be used. For example, if the thread types correspond to pixel threads and vertex threads, it may be desirable to give priority to vertex threads (e.g., because some pixel threads might not be able to be initiated until processing of a relevant vertex thread has been completed). Thus, one selection rule might always choose a vertex thread over a pixel thread. Another selection rule might be defined as a repeating sequence of some number of vertices followed by some number of pixels (e.g., two vertices then one pixel, or three vertices then two pixels, or, more generally, v vertices followed by p pixels for arbitrary integers v and p). Importance can also be defined dynamically, e.g., depending on the number of vertex and/or pixel threads that are currently active or that are currently awaiting processing. Selection rules for thread type priority circuit 412 may be made configurable to support optimization for a particular system implementation.

Global arbitration unit 410 selects between PCa and PCb based on type selection signal A/B and provides the selected program counter value (labeled PCi) to Icache 132 substantially as described above. In some embodiments, the type selection signal A/B may occasionally specify thread type A (or B) during a clock cycle in which no thread of type A (B) was selected by the type-specific arbiter 402 (404). Global arbitration unit 110 may be configured to select PCb (PCa) in this event or to select no thread (i.e., no PCi is sent to Icache 132).

It will be appreciated that the fetch circuit and buffer described herein are illustrative and that variations and modifications are possible. Where different threads (or different thread types) have physically or logically separate instruction caches, the fetch circuit may be configured to direct the selected PC value to the appropriate cache, or to provide a thread (or thread type) identifier that can be used to select the appropriate cache. The buffer may provide storage for more than one instruction per thread, e.g., by providing a FIFO register for each thread, and the fetch circuit may select a next thread to fetch based on the number of invalid or unused entries in each of the FIFOs.

In some embodiments, it is not necessary for the fetch circuit to prefill the buffer to any particular level prior to instruction issue. Instead, the buffer may tend to fill naturally as instruction issue occasionally skips clock cycles due to data dependencies and the like. The thread selection logic of the fetch circuit is advantageously configured to select threads only when space exists in the buffer for an storing instruction from that thread, thereby avoiding buffer overflow.

Figure 5:
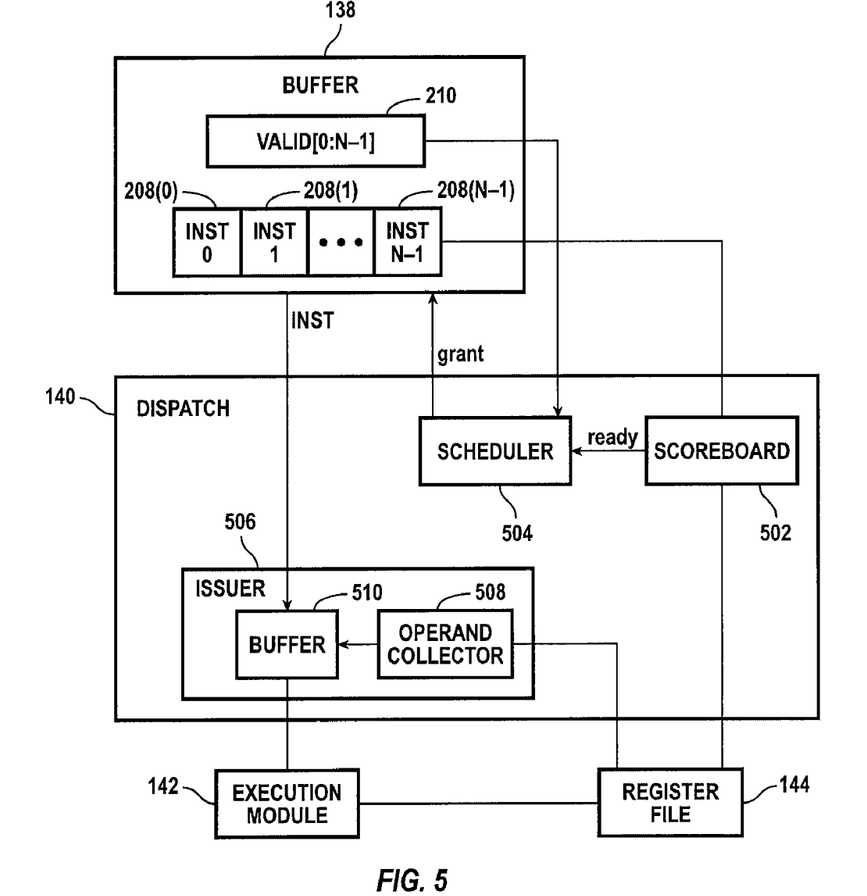
FIG. 5 is a simplified block diagram of an instruction dispatch circuit according to an embodiment of the present invention.

FIG. 5 is a simplified block diagram of a dispatch circuit 140 according to an embodiment of the present invention. Dispatch circuit 140 includes a scoreboard circuit 502, a scheduler 504, and an issue circuit (or issuer) 506. Scoreboard circuit 502, which may be of generally conventional design, reads each of the (valid) instructions in buffer 138 and receives signals from register file 144 indicating which registers contain valid data. Using the valid-data signals, scoreboard circuit 502 determines, for each instruction in buffer 138, whether the source operands are available in register file 144. Scoreboard circuit 502 generates a set of ready signals (e.g., one bit per thread) indicating which instructions in buffer 138 are ready to be executed, i.e., have their source operands available in register file 144. Scheduler 504 receives the ready signals from scoreboard 502 and the valid signals from buffer 138 and selects a next instruction to dispatch. The selected instruction is dispatched to issuer 506, which issues the instruction by forwarding it to execution module 142. The thread identifier of the thread to which the selected instruction belongs may also be forwarded to issuer 506 and/or execution module 142, e.g., to enable selection of the appropriate registers for the source operands and result data.

Scheduler 504 is advantageously configured to select among the ready instructions in buffer 138 with few or no constraints based on an order among threads. For example, scheduler 504 may select the ready instruction in buffer 138 that has been waiting (valid) longest, regardless of when that thread was last selected.

Figure 6:
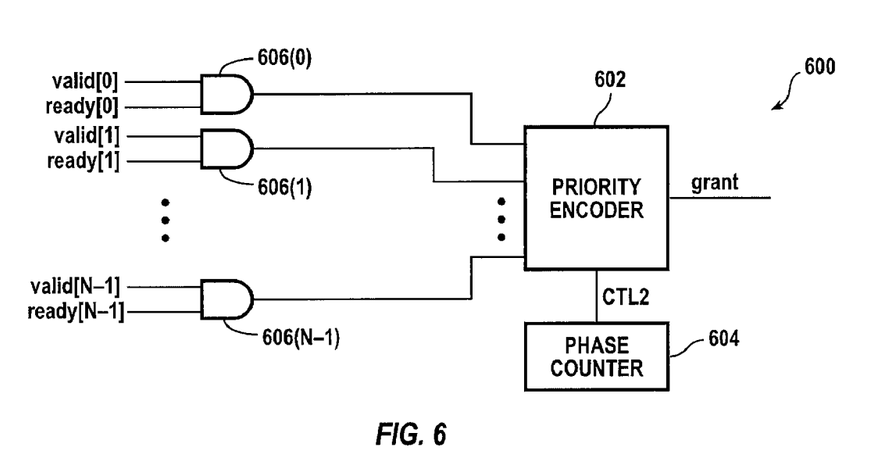
FIG. 6 is a simplified block diagram of selection logic for selecting an instruction to issue according to an embodiment of the present invention.

FIG. 6 is a simplified block diagram of a selection logic circuit 600 that may be included in scheduler 504 for selecting a thread to be dispatched from buffer 138. Selection logic circuit 600 includes a priority encoder 602 and a phase (or token) counter 604. The valid signal and the ready signal for each thread are provided as inputs to a respective AND circuit 606. Priority encoder 602 receives the output signals from AND circuits 606, i.e., a signal for each thread that is asserted when the thread's instruction in buffer 138 is valid and ready to be executed. (In some embodiments, the ready signal for a thread is not asserted when the thread is invalid, so that AND circuits 606 may be omitted.) Priority encoder 602, which may be implemented using conventional digital logic circuitry, selects the highest-priority thread for which the ready and valid signals are both asserted (i.e., the highest priority ready thread), where the priority ranking among the threads is determined based on a control signal (CTL2) provided by phase counter 604. Phase counter 604 is a modulo N counter that increments on every clock cycle; the control signal CTL2 corresponds to the current value of counter 604. In this embodiment, control signal CTL2 determines the thread number of the highest-priority thread, and priority encoder 602 ranks the remaining threads in order of ascending (or descending) thread numbers, modulo N. Phase counter 604 may have the same phase as current thread counter 304 of FIG. 3 (both counters may be implemented as the same counter if desired), or it may have a different phase.

Operation of priority encoder 602 is similar to that described above for priority encoder 302 of FIG. 3, and because phase counter 604 increments at each clock cycle, the priority ranking of the threads is different for different clock cycles. For example, during a first clock cycle, current thread counter 604 has value 0, and priority encoder 602 gives highest priority to thread 0 (i.e., selects thread 0 if thread 0 is ready), then to thread 1 if thread 0 is not ready, and so on until a ready thread is found or a maximum number of threads is considered. During the next clock cycle, current thread counter 604 has value 1, and priority encoder 602 gives highest priority to thread 1, then to thread 2 if thread 1 is not ready, and so on.

Once a thread becomes ready, it remains ready until its instruction is dispatched. Thus, while selection logic circuit 600 does not guarantee that, on any given clock cycle, the thread that has been ready longest is selected, it will be appreciated that any thread that becomes ready (and valid) will be selected within N clock cycles of becoming ready. In some embodiments, it may be desirable to prevent the same thread from being selected during consecutive clock cycles; accordingly, the maximum number of threads that priority encoder 602 considers during a clock cycle may be limited to a number smaller than the total number N of threads. (This maximum number may also be a configurable parameter of the system.)

It will be appreciated that the selection logic circuit and selection rules described herein are illustrative and that variations and modifications are possible. The various circuit components described herein may be implemented using conventional digital circuit designs and technologies. Different logic circuits may also be implemented to support different selection rules. For example, in superscalar embodiments (where more than one instruction may be issued per clock cycle), the selection logic may be configured to select multiple instructions per clock cycle. Moreover, devices other than priority encoders may be used for determining which ready thread to select. For instance, the selection logic circuit may maintain a "least recently invalid" bit field that is updated when a transition of one of the valid bits between the logical true and logical false states is detected; this bit field may be used to select the ready instruction that has been valid the longest. In still other embodiments, counters may be used to determine elapsed time since a thread became valid (or ready) and/or elapsed time since a thread was last selected; comparison logic that operates on the counter values may be provided to identify the ready thread that has been valid the longest.

In still other embodiments, other kinds of selection rules may be implemented. For instance, selection may be based in part on thread type (e.g., using selection logic similar to that shown in FIG. 4 above). Selection may also be based in part on the type of operation to be performed (e.g., giving different priorities to a MULTIPLY operation, a CALL operation, an ADD operation and so on). In addition, selection may take into account the state of the execution module. In one such embodiment, execution module 142 contains specialized execution units (or execution pipes), with different operations being directed to different execution units; e.g., there may be an execution unit that performs floating-point arithmetic and another that performs integer arithmetic. If the execution unit needed by a ready instruction for one thread is busy, an instruction from a different thread may be selected. For instance, suppose that at a given time, the floating-point pipeline is busy and the integer pipeline is free. A thread with an integer-arithmetic instruction ready can be given priority over a thread with a floating-point instruction.

Further, rules governing priority among the threads (at the fetch and/or dispatch stages) may be varied. For instance, in some embodiments, priority does not rotate among the threads on every clock cycle. In some embodiment, priority rotates only after a clock cycle during which an instruction is issued. Highest priority may rotate, e.g., to the next thread number after the thread for which an instruction was issued or to the next sequential thread number, regardless of the thread to which the issued instruction belonged. In still another such embodiment, priority rotates only when execution of a thread ends (either normally or due to some invalidating condition). For example, the first ("oldest") thread to begin executing may be assigned highest priority and may retain highest priority until it completes; subsequent ("younger") threads are assigned decreasing priority according to the order in which they begin execution. In this embodiment, instructions for younger threads are issued only on cycles where the next instruction for any older thread is not ready. Some embodiments support multiple rules governing priority, with the particular rule to be applied being a configurable system parameter.

Referring again to FIG. 5, in response to the grant signal from scheduler 504, the requested instruction in buffer 138 is dispatched to issuer 506. In one embodiment, issuer 506 includes an operand collector 508 and a buffer 510. Buffer 510 receives the dispatched instruction, and operand collector 508 collects source operands for the instructions in buffer 510 from register file 144. Depending on the configuration of register file 144, collection of source operands may require multiple clock cycles, and operand collector 508 may implement various techniques for optimizing register file accesses for efficient operand collection given a particular register file configuration; examples of such techniques are known in the art.

Buffer 510 is advantageously configured to store collected operands together with their instructions while other operands for the instruction are being collected. In some embodiments, issuer 506 is configured to issue instructions to execution units 142 as soon as their operands have been collected. Issuer 506 is not required to issue instructions in the order in which they were dispatched. For example, instructions in buffer 510 may be stored in a sequence corresponding to the order in which they were dispatched, and at each clock cycle issuer 506 may select the oldest instruction that has its operands by stepping through the sequence (starting with the least-recently dispatched instruction) until an instruction that has all of its operands is found. This instruction is issued, and instructions behind it in the sequence are shifted forward; newly dispatched instructions are added at the end of the sequence. The sequence may be maintained, e.g., by an ordered set of physical storage locations in buffer 510, with instructions being shifted to different locations as preceding instructions are removed.

In one embodiment, an instruction that has been dispatched to issuer 506 remains in buffer 138 until it has been issued to execution module 142. After dispatch, the instruction is advantageously maintained in a valid but not ready state (e.g., the valid bit 210 for a dispatched instruction may remain in the logical true state until the instruction is issued). It will be appreciated that in embodiments where issuer 506 may issue instructions out of the dispatch order, this configuration can help to prevent multiple instructions from the same thread from being concurrently present in buffer 510, thereby preserving order of instructions within a thread.

In other embodiments, issuer 506 does not perform operand collection. For example, issuer 506 may issue instructions to execution module 142 (or specific execution units thereof) as they are received and signal register file 144 to provide the appropriate source operands to execution module 142 (or specific execution units thereof). In this embodiment, operand collector 508 and buffer 510 may be omitted. It will be appreciated that the particular configuration of issuer 506 is not critical to understanding the present invention.

It will be appreciated that the dispatch circuit described herein is illustrative and that variations and modifications are possible. The various logic circuits described herein for the scheduler circuit may be implemented using conventional digital circuit designs and technologies. Different logic circuits may also be implemented to support different selection rules. The scheduler may also include various kinds of logic circuitry implementing additional selection rules, e.g., a minimum number of cycles before a thread can be reselected for issue, and/or different selection rules, e.g., giving priority to one thread type over another. Such rules may be implemented using logic circuitry and techniques similar to those described above in the context of thread selection for the fetch circuit.

Some alternative embodiments support superscalar (i.e., more than one per clock cycle) instruction issue, allowing issuer 506 to deliver two or more instructions per clock cycle to execution module 142. In order to keep up with the rate of issue, dispatch circuit 140 of FIG. 5 is advantageously modified to dispatch two or more ready instructions each clock cycle to buffer 510 of issuer 506. For instance, priority encoder 602 of FIG. 6 can be modified to generate a grant signal for each of the two highest-priority ready threads in buffer 138, resulting in two instructions per cycle being delivered to buffer 510 of issuer 506.

Figure 7:
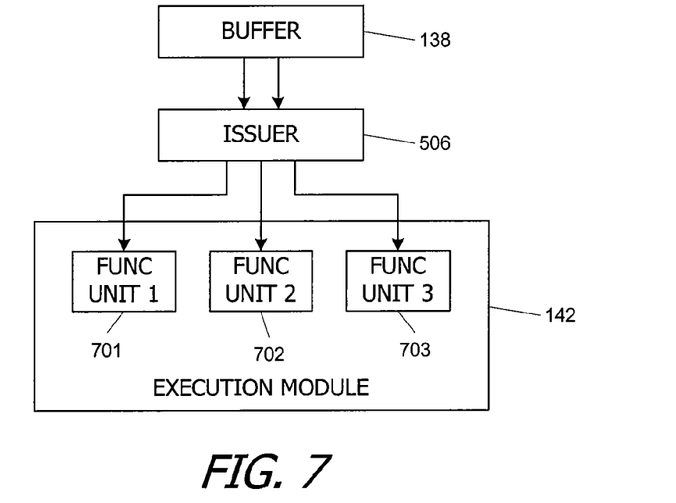
FIG. 7 is a simplified block diagram of an instruction issuer and execution module according to an embodiment of the present invention that supports superscalar instruction issue.

FIG. 7 is a simplified block diagram of an instruction issuer and execution module according to an embodiment of the present invention that supports superscalar instruction issue. In this embodiment, execution module 142 includes multiple functional units 701, 702, 703. Each functional unit implements a pipeline that performs a different instruction or class of instructions. For example, in one embodiment, functional unit 701 performs various integer and floating-point arithmetic operations (addition, multiplication, etc.), as well as Boolean logical operations, comparisons, format conversion, etc.; functional unit 702 performs planar interpolation as well as fast function approximation operations (e.g., for sine, cosine, logarithms, and the like); and functional unit 703 performs texture fetching and blending operations. Some functions (e.g., register-to-register moves, floating-point multiply, etc.) may be implemented in multiple ones of functional units 701-703, and an instruction may be issued to any functional unit capable of executing it.

Functional units 701-703 may also differ from each other in the length of their respective pipelines. For instance, in one embodiment, functional units 701 and 702 are each implemented as 10-cycle or 15-cycle pipelines, while functional unit 703 is implemented as a pipeline of 100 cycles or more. In addition, the functional units might also have different throughputs. For example, functional unit 701 might be able to accept a new instruction and to produce a result (after the appropriate latency) every clock while functional unit 703 can accept a new instruction and produce a result (after the appropriate latency) every tenth clock. In each case, issuer 706 issues to a particular functional unit only as frequently as that functional unit can accept a new instruction; suitable techniques for controlling rate of issue on a per-functional-unit basis are known in the art and may be used in this embodiment.

In this embodiment, up to two instructions can be dispatched in parallel from buffer 138 (see FIG. 4) and loaded into buffer 510 (see FIG. 5) of issuer 506. Operand collector 508 collects the operands as described above. Issuer 506 can issue up to two instructions for which operands have been collected to functional units 701-703 in parallel, with each functional unit receiving zero or one instruction. The instructions issued in a given clock cycle may be drawn from the various threads in any combination desired. In some embodiments, issue may be limited to one instruction per thread per clock cycle, while other embodiments may allow multiple instructions from the same thread to be issued in the same clock cycle.

It will be appreciated that the superscalar instruction issue logic described herein is illustrative and that variations and modifications are possible. For instance, the number of functional units is not limited to three, and the number of instructions issued in parallel is not limited to two. An arbitrary number (P) of instructions may be issued to an arbitrary number (X) of functional units, provided only that $P \leq X$. Similarly, the fetch circuit may also be modified to fetch more than one instruction per clock cycle. Thus, it is to be understood that the present invention includes embodiments that fetch an arbitrary number (F) of instructions and issue an arbitrary number of instructions (P) each cycle, where the numbers F and P may be allocated among multiple threads in any manner desired. Embodiments of the invention may also be adapted for use in asynchronous processors.

Those skilled in the art with access to the present teachings will recognize that in certain embodiments of the present invention, instructions from different threads, including threads of different types, can be freely interleaved in any order. Thus, an instruction from one thread might be followed by another instruction from the same thread or an instruction from any one of the other threads. To the extent that the threads are executing different programs or executing different portions of the same program, the diversity of available work at any given time is increased. The increased diversity, in turn, increases the possibilities for exploiting the full processing capacity of the execution module and for using other instructions to hide latency associated with executing a first instruction.

Figure 8:
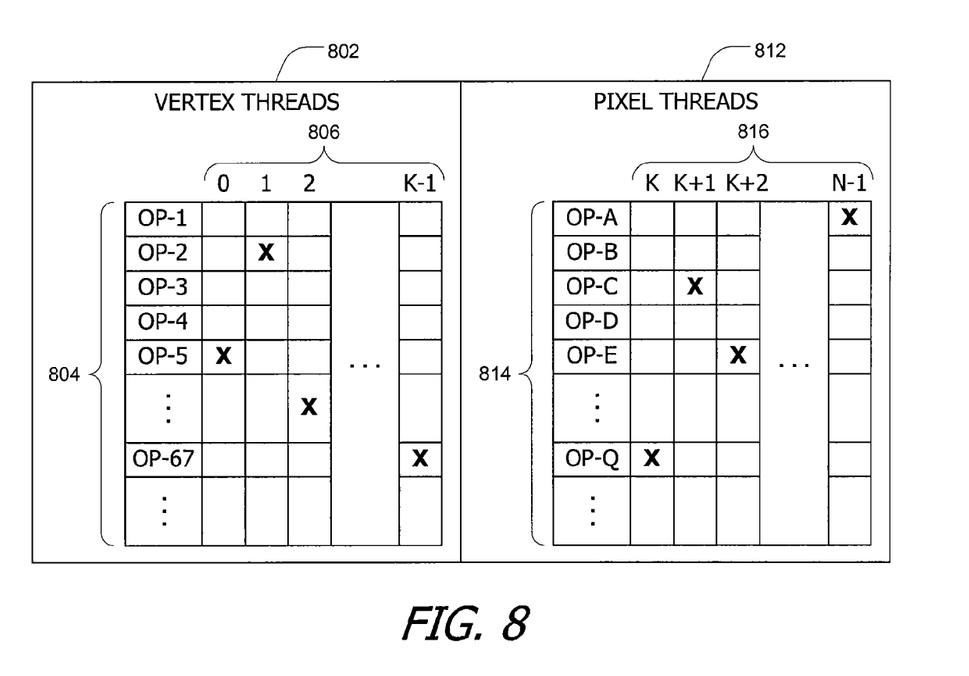
FIG. 8 is a snapshot view of instructions for different threads that might be ready at the same time, illustrating a principle of diversity of work according to an embodiment of the present invention.

FIG. 8 is a snapshot view of instructions for different threads that might be ready at the same time, illustrating a principle of diversity of work according to an embodiment of the present invention. In FIG. 8, it is supposed that a processing core executes N concurrent threads. Of these, threads 0 to K−1 are of a first type (e.g., vertex threads) while threads K to N−1 are of a second type (e.g., pixel threads). Program counter table 802 shows, in column 804, the instruction sequence (OP-1, OP-2, etc.) for a vertex shader program common to threads 0 to K−1. PC block 806 indicates, with an X in the appropriate row, the ready instruction for each vertex thread. Similarly, program counter table 812 shows, in column 814, the instruction sequence (OP-A, OP-B, etc.) for a pixel shader program common to threads K to N−1. PC block 816 indicates, with an X in the appropriate row, the ready instruction for each pixel thread. It is to be understood that any of the threads not explicitly shown in FIG. 8 may also have ready instructions at the snapshot time.

In one embodiment, functional units 701 and 702 can each accept an instruction on every clock cycle, while functional unit 703 has a lower input rate, e.g., one every 10 clock cycles. Issuer 506 issues up to two instructions for any of the N threads to functional units 701-703 of FIG. 7 on each clock cycle. Any two ready instructions can be issued as long as the two instructions are destined for different ones of functional units 701-703, and each of the destination functional units is ready to receive a new instruction. Since functional units 701 and 702 can each accept a new instruction every clock cycle, these units 701, 702 can be kept busy if one instruction for each of units 701 and 702 is ready on each clock cycle. Functional unit 703 is kept busy if it receives one instruction every 10 clock cycles.

Issuer 506 can be configured to determine, on each clock cycle, whether functional unit 703 is ready for a new instruction. If so, and if a suitable instruction is ready, issuer 506 issues that instruction and an instruction for one or the other of functional units 701 and 702. If functional unit 703 is not ready or if no instruction for functional unit 703 is ready, issuer 506 can issue one instruction each to functional units 701 and 702. It should be noted that in this embodiment, there will be a few cycles where functional unit 701 or 702 could have received a new instruction but did not. In an alternative embodiment, issuer 506 can issue up to three instructions per clock, one to each of functional units 701-703, and each functional unit receives a new instruction on every clock when the unit is ready and an instruction for that unit is ready.

To maximize the likelihood that an instruction destined for one of functional units 701-703 is ready whenever the functional unit is ready, fetch unit 400 of FIG. 4 advantageously keeps issuer 506 supplied with a diverse set of instructions from which to choose instructions to issue. For instance, in FIG. 8, issuer 506 can choose among N instructions including OP-2 (for thread 1), OP-5 (for thread 0), OP-67 (for thread K−1), OP-A (for thread N−1), OP-C (for thread K+1), or OP-Q (for thread K), and so on for the other active threads.

In general, for a large enough value of N and typical shader programs, it can be expected that at least some of these ready instructions are destined for different functional units. For instance, in some conventional rendering programs, only pixel shaders include texture processing instructions that, in this example, would be executed by functional unit 703. If only vertex threads were available, functional unit 703 would be idle all of the time. Conversely, if only pixel threads were available, functional unit 703 would be used, but other functional units 701, 702 might go unused for some number of cycles while issuer 506 awaited the result of a texture-processing operation from functional unit 703.

In an embodiment of the present invention, issuer 820 can interleave texture instructions from pixel shaders (table 812) with instructions from vertex shaders (table 802) and thus keep the functional units 701-703 more fully used than would be the case if only one thread type were available. For instance, while functional unit 703 is executing texture instructions for one or more pixel threads, functional units 701 and 702 can be kept occupied executing other types of instructions for other types of threads. Since across-thread order does not limit the pool of available instructions, any number of instructions for any number of threads can be executed in the time it takes to execute one long-latency instruction such as a texture instruction. Thus, allowing core 800 to execute multiple thread types and to issue instructions without regard to across-thread order increases the diversity of available work and decreases idle cycles.

It should also be noted that at least some diversity of work can also exist among threads of the same type. For instance, table 802 indicates that, at a given time, different vertex threads can be at very different points in the same program. Thread 1, for instance, is near the beginning of the program, while thread K−1 is at a later point. Similarly, table 812 indicates that, at a given time, different pixel threads can be at very different points in the same program. This situation arises in part due to the ability to issue instructions from different threads out of any thread order; even threads that are started on consecutive clock cycles do not necessarily stay "in step" with each other as execution proceeds.

To the extent that different portions of a program include different mixes of instructions, divergence of the execution points (or program counters) for different threads of the same type can also increase diversity of work. For instance, referring to table 812, suppose that instructions OP-A through OP-E are arithmetic instructions destined for functional unit 701 of FIG. 7, while instruction OP-Q is a long-latency texture instruction to be executed by functional unit 703. After, or in parallel with, issuing OP-Q for thread K, issuer 820 can issue, e.g., OP-A for thread N−1, followed by OP-C for thread K+1, and so on. Thus, diverse work from threads of the same type may also be used to maximize the degree to which the processing capacity of execution module 142 is used.

It is to be understood that the number of thread types, number of threads, and other features illustrated in FIG. 8 are illustrative. The invention is not limited to two thread types; in some embodiments, an execution core might concurrently execute threads of more or fewer types. For instance, in one alternative embodiment, the execution core can concurrently execute vertex threads, pixel threads, and geometry threads that execute "geometry shader" programs. In one embodiment of a geometry shader thread, the input data is a primitive or other grouping of vertices, and the output data is a grouping of vertices that may contain more, fewer, or the same number of vertices as the original.

A thread's "type," as used herein, can be determined by reference to the type of input data that it processes; for instance, a "vertex" thread processes vertex data while a "pixel" thread processes pixel data. In some alternative embodiments, a thread's type might be determined by reference to the program it executes; for instance, threads can be considered of the same type if they execute the same program. It should be noted that in some embodiments, one or another of the shader programs might be changed during a rendering operation, and threads executing the old shader and the new shader can coexist in the same execution core. Threads of the old and new shader programs might be considered as being of the same type (since both process the same type of input data), or they might be considered as being of different type (since they execute different programs), depending on implementation.

While the invention has been described with respect to specific embodiments, one skilled in the art will recognize that numerous modifications are possible. For instance, out-of-order instruction issue within a thread may be implemented if desired, e.g., by adapting out-of-order issue techniques from general-purpose processors that allow issue of any ready instruction within an "active window." For instance, two or more instructions per thread could be loaded into buffer 510 of issuer 506 of FIG. 5. If, in some clock cycle, the oldest instruction for the thread with highest priority cannot be issued (e.g., because the destination functional unit is not ready or because an operand has not yet been collected), a newer instruction for that thread that can be issued might be selected instead.

The execution cores described herein are not limited to any particular number or configuration of execution units. For example, multiple execution units may collaborate to process a given instruction, different execution units may receive different instructions (or the same instruction with different data) in parallel, and so on. The execution units may process instructions with fixed or variable latency and may be pipelined to accept new instructions every clock cycle or, more generally, at intervals consisting of some fixed number of clock cycles.

As noted above, any number of threads and any number of thread types may be supported, with each thread type corresponding to a programmed sequence of instructions to be executed. Program instructions may be provided in various ways, including built-in instructions stored in nonvolatile memory of the graphics processor or other graphics processing subsystem components, instructions supplied by a graphics driver program at system initialization and/or runtime, and/or application-supplied program code (e.g., in the case of a programmable shader). Programs may be created in suitable high-level languages (e.g., C, Cg, or the like) and compiled using an appropriate compiler for the programming language and the graphics processor on which the program is to be executed. Translation of input instructions to a different format (or a different instruction set) that is compatible with the execution units may be provided within the execution core, within other components of the graphics processor, or elsewhere in the computer system.

In some embodiments, some or all of the threads may be executed using single-instruction, multiple-dispatch (SIMD) techniques, thereby further increasing parallelism in an execution core without requiring additional instruction fetching or program counter logic. For instance, each functional unit in an execution core may be implemented on a SIMD pipeline capable of performing identical operations on multiple sets of input operands (e.g., 8, 16, 32 sets) in parallel. Multiple threads of the same program can be executed as a "SIMD group." Instructions for the SIMD group can be fetched, dispatched and issued as if the group were a single thread. Thus, if the fetch and issue logic supports N concurrent threads while the functional units are each M-way SIMD pipelines, the total number of concurrent threads in the core could be as many as N*M. Such SIMD parallelism, however, is not critical to the present invention.

Graphics processors as described herein may be implemented as co-processors in a wide array of computing devices, including general purpose desktop, laptop, and/or tablet computers; various handheld devices such as personal digital assistants (PDAs), mobile phones, etc.; special-purpose computer systems such as video game consoles; and the like. In some embodiments, it is possible to leverage the execution core(s) of a graphics processor for general-purpose computing operations that might or might not be related in any way to image generation. Accordingly, although vertex, pixel, and/or geometry shaders as might be found in a rendering application are used as examples herein, it is to be understood that a thread may execute any program, not limited to shader programs or graphics-related programs.

It will also be appreciated that, although the invention has been described with reference to graphics processors, the systems and methods described herein may also be implemented in other multithreaded microprocessors.

Thus, although the invention has been described with respect to specific embodiments, it will be appreciated that the invention is intended to cover all modifications and equivalents within the scope of the following claims.

What is claimed is:

1. A method for executing a plurality of threads in a multithreaded processor, the method comprising:
   defining a plurality of threads, wherein each thread executes a sequence of program instructions and at least a subset of the plurality of threads are of different types;
   fetching a first instruction for a first one of the plurality of threads;
   fetching a second instruction for a second one of the plurality of threads, the second thread of a first type comprising a vertex thread type;
   issuing the first instruction, wherein the first instruction has a latency period associated therewith; and
   during the latency period associated with the first instruction, issuing the second instruction based at least in part on a priority ranking associated with the first type,
   wherein the first instruction and the second instruction are issued in an order independent of an order of fetching the first and second instructions, and wherein the second instruction is issued before one or more other instructions ready to issue for a longer duration than the second instruction, the one or more other instructions for a thread of a second type comprising a pixel thread type, wherein the pixel thread type is associated with a lower priority ranking than the priority ranking associated with the vertex thread type.

2. The method of claim 1 wherein the first thread and the second thread execute different programs.

3. The method of claim 1 wherein the first thread and the second thread execute the same program on different input data.

4. The method of claim 3 wherein the first instruction and the second instruction are instructions from different portions of the same program.

5. The method of claim 1 wherein the first instruction is issued to a first functional unit in the multithreaded processor and the second instruction is issued to a second functional unit in the multithreaded processor.

6. The method of claim 1 further comprising:
   during the latency period associated with the first instruction, issuing a third instruction comprising a selected one of the one or more other instructions, wherein the first instruction, the second instruction, and the third instruction are issued in an order independent of an order of instruction fetch.

7. The method of claim 6 wherein the third instruction is an instruction for a third one of the plurality of threads.

8. The method of claim 6 wherein the third instruction is an instruction for the first one of the plurality of threads.

9. The method of claim 8 wherein the first instruction and the third instruction are issued during consecutive processing cycles.

10. The method of claim 6 wherein the third instruction and the second instruction are issued in parallel.

11. A method for executing a plurality of threads in a multithreaded processor, the method comprising:
    defining a plurality of threads, wherein each thread executes a sequence of program instructions and at least a subset of the plurality of threads are of different types;
    fetching a plurality of instructions, including:
        a first instruction for a first one of the plurality of threads, the first thread of a first type;
        a second instruction for a second one of the plurality of threads, the second thread of the first type comprising a vertex thread type; and
        a third instruction for a third one of the plurality of threads, the third thread of a second type comprising a pixel thread type, wherein the first instruction is fetched subsequently to the third instruction;
    issuing the first instruction to a first functional unit in the multithreaded processor prior to issuing the third instruction, based at least in part on a priority ranking associated with the first type; and
    in parallel with issuing the first instruction, issuing the second instruction to a second functional unit in the multithreaded processor,
    wherein the third instruction was ready to issue for a longer duration than the first instruction when the first instruction issued, and the pixel thread type is associated with a lower priority ranking than the priority ranking associated with the vertex thread type.

12. The method of claim 11 wherein the first thread and the second thread execute different programs.

13. The method of claim 11 wherein the first thread and the second thread execute a same program on different input data, and wherein the first instruction and the second instruction are different instructions from the same program.

14. The method of claim 11 further comprising:
    issuing the third instruction during a latency period associated with one of the first instruction or the second instruction.

15. A microprocessor configured for parallel processing of a plurality of threads, wherein each thread executes a sequence of program instructions, the microprocessor comprising:
    an execution module adapted to execute instructions for all of the plurality of threads, wherein at least a subset of the plurality of threads are of different types;
    a fetch circuit adapted to fetch instructions from a sequence of program instructions for each of the plurality of threads; and
    an issue circuit adapted to issue the instructions fetched by the fetch circuit to the execution module, wherein the instructions for different ones of the plurality of threads are issued in an order based at least in part on priority rankings based on respective thread types of the different threads and independent of an order in which the instructions for the different ones of the plurality of threads were fetched, wherein a pixel thread type is associated with a lower priority ranking than a priority ranking associated with a vertex thread type,
    the issue circuit being further adapted such that, during a latency period associated with a first issued instruction for a first one of the threads comprising a pixel thread, the issue circuit issues at least one instruction for a second one of the threads comprising a vertex thread.

16. The microprocessor of claim 15 wherein the execution module includes a plurality of functional units and wherein the issue circuit is further adapted to issue at least two instructions in parallel, each of the instructions issued in parallel being directed to a different one of the functional units.

17. The microprocessor of claim 16 wherein the issue circuit is further adapted such that each of the instructions issued in parallel is for a different one of the plurality of threads.

18. The microprocessor of claim 16 wherein a maximum number of instructions issuable in parallel is less than the number of functional units in the execution module.

19. The microprocessor of claim 15 wherein the fetch circuit is further adapted to fetch a subsequent instruction for a first thread in response to the issue circuit issuing a previously fetched instruction for the first thread.

* * * * *